March 3, 1959     A. H. PAPE     2,875,550

BAIT HOLDING FISH HOOK UNIT

Filed Sept. 24, 1956

INVENTOR.
AUGUST H. PAPE
BY
AGENT

United States Patent Office 2,875,550
Patented Mar. 3, 1959

2,875,550

BAIT HOLDING FISH HOOK UNIT

August H. Pape, Kentfield, Calif., assignor to Hilmer F. Pape, Sunnyvale, Calif.

Application September 24, 1956, Serial No. 611,428

4 Claims. (Cl. 43—44.2)

This invention relates to fish hooks of the type adapted to hold bait thereon without penetration of the bait.

It is known that hooks of this type comprising two hooks are made with their shanks joined to a common eye so that shanks of the hooks may be spread to resiliently clamp bait therebetween. The pressure of the shanks on live bait is likely to kill the bait, or shorten the life thereof, also interfere with natural movement of the bait in the water. When dead bait of the whole fish variety is held by such a hook, it is disposed at such an angle to the shanks as will objectionably expose the hooks and shanks. This angular relation of the dead bait fish to the shanks also causes the bait to assume an unnatural position in trolling or otherwise moving the bait through the water.

It is an object of the present invention to provide an improved bait-holding fish hook unit which eliminates the objections above noted by reason of having embodied therein novel means for holding a live bait fish in substantially parallel relation to the longitudinal axis of the unit without injuring the fish, causing the fish to assume an unnatural position, interfering with normal movement of the fish in the water, or objectionably exposing the hook unit.

It is another object of this invention to provide a fish hook unit such as described in which the aforesaid novel bait holding means may be used to advantage for holding a dead bait fish or cut bait in a position favorable to having the baited unit taken by a fish.

It is another object of this invention to provide a fish hook wherein novel means are operable for embracing bait to securely hold the bait on the hook in a particularly effective manner.

A further object hereof is the provision of a bait-holding fish hook in which novel means are provided adjacent the eye and adjacent the barbed end or ends of the unit, so that the bait may be embraced at axially spaced points and held alongside the unit.

Yet another object of this invention is the provision of a hook unit such as described, wherein a snell, leader or the fishing line attached to the unit may be looped around the bait in a particularly effective manner to aid in holding the bait in the desired position.

An additional object is the provision of a fish hook unit wherein portions thereof are constructed and arranged to embrace a bait fish around the head and the tail portions of the fish, respectively, in such a manner that the fish will be securely held against dislodgment in casting and trolling without injuring the fish or interfering appreciably with natural movement of the fish in the water.

It is a further object of this invention to provide a fish hook such as described having a double snell or leader arranged so that one part of the leader or snell may be formed as a loop to embrace a part of the bait.

Yet another object of the invention is the provision of a fish hook unit such as described, which includes two hooks having their shanks joined to and extended divergently from a common eye. The bills and portions of the shanks joined thereto are offset laterally in the same direction from the remainder and substantially straight portions of the shanks. These offset portions cross one another between the shanks proper and the barbed ends of the hooks. With this formation the barbed end portions of the bills may be pressed toward one another to spread the shanks so that the tail portion of a bait fish may be inserted therebetween and thereby clamped, with both barbed ends disposed on one side of the fish while the shanks proper extend close along the other side of the fish toward the head of the fish. When the tail portion of the bait fish is embraced by the hook unit, a loop may be formed by a part of the snell or line connected with the hook so that it readily may be looped around the head portion of the fish, preferably behind the gills. In this manner the bait will be securely held on the hook in the desired position such that whether dead or alive it will present a life-like appearance in the water favorable to being taken by a fish.

It is another object of this invention to provide a fish hook unit such as described which in form may have one of the bills and the barbed end associated therewith cut off or removed, if it is desired to have but one barbed hook in the unit instead of two, and wherein the bait will still be subject to being held in place on the unit between the shanks in the advantageous manner hereinbefore noted. This removal may be necessary in instances where fish and game laws prohibit use of multiple hooks or in case one barbed hook is preferred by the particular fisherman.

I will describe three forms of the bait-holding fish hook unit embodying my invention, and will then define the novel features thereof in claims.

Figure 1:
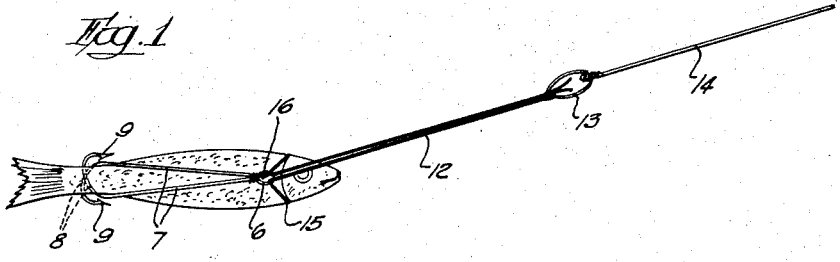
Fig. 1 is a side elevational view of a fish hook unit embodying the present invention as it would appear with a bait fish held in the desired position thereon.
Figure 2:
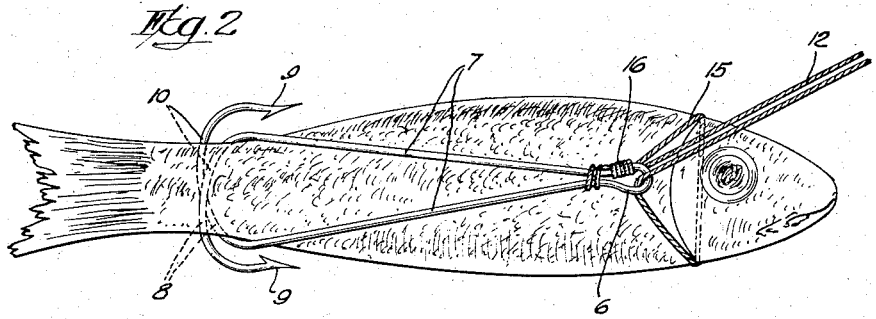
Fig. 2 is a side elevational view similar to Fig. 1 on an enlarged scale showing more in detail how the bait fish is embraced by the hook unit.

In carrying out this invention I employ a pair of fish hooks having a common eye 6 from which substantially straight shanks 7 extend divergently to the bills 8. These bills are provided with the usual barbed and pointed ends 9.

Adjacent the juncture of the shanks 7 with the bills 8 the shanks are bent to provide laterally offset portions 10 extending in the same direction to one side of the shanks and which cross one another at the outer extremities thereof, that is, between the shanks proper and the pointed barbed ends 9. This disposes the major portions of the bills 8 and the barbed ends 9 in laterally offset relation to the shanks proper as will be apparent with reference to Fig. 3, but with the bills facing in opposite directions.

As here shown the hook unit is made of a single piece of resilient steel wire but may be made of separate hooks joined adjacent the ends of the shanks in any suitable manner, provided the shanks extend divergently from the point or eye, and with the bills and barbed ends in the form and arrangement here shown.

Means are provided on the hook unit hereof for embracing the head portion of a bait fish while the tail portion of the fish is embraced by the bill portions 8 of the hook. As here shown this means is embodied in a double flexible snell 12 joined to the eye 6 and adapted to be coupled, for example, as at 13 to a fishing line indicated at 14. This snell may be fixed to the eye 6 in any suitable manner provided one length or strand thereof is longer than the other and extends through the eye so that it may be formed into a loop 15 as shown in Figs. 1–4. Obviously, a single snell could be used between the eye and fishing line or the fishing line itself could be used provided either is attached to the hook so that a loop may be formed at and connected with eye. The showing in Figs. 1–4 teaches how a single snell or the fishing line could be attached to the hook so that a loop similar to the loop 15 may be formed. Accordingly, it is thought that it is unnecessary to illustrate the manner in which a single flexible element or snell on the fishing line may be connected to form the loop. The advantage in employing a double snell is that should one part of the snell part or be cut the other part will remain intact. Another advantage in having the double snell fastened to the eye as here provided, is that the snell parts readily can be varied as to relative length so that when the part thereof connected with the fishing line is pulled or placed under tension the loop 15 will be contracted the desired extent such that it will hold the live bait without cutting into or injuring the bait.

The double snell 12 as here shown is wrapped around and between the shanks 7 and the eye in a manner forming a knot 16 securely fastening the snell to the hook. Any suitable knot or method of fastening the snell to the hook may be used, provided it will make possible the formation of a loop similar to the loop 15.

Figure 3:
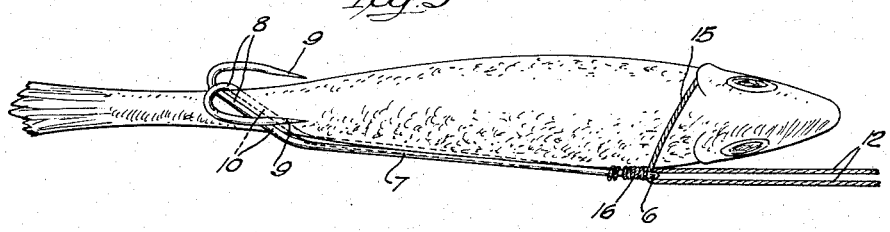
Fig. 3 is a top plan view of the hook assembly and bait fish shown in Fig. 2.

In the use of the hook unit, the bills 8 are forced together to provide a space therebetween and between the shanks 7 so that the tail portion of a bait fish may be passed between the bills. Upon release of the bills they will spring together due to the resiliency of the hook unit and thereby closely embrace the tail portion of the fish. After the tail portion is embraced the loop 15 is placed around the head portion of the fish preferably behind the gills as shown in Figs. 1–4. With the fish thus held around the tail and head, the two barbed ends 9 lie along one side of the fish while the shanks 7 and eye 6 lie along the other side of the fish as shown in Fig. 3, thereby securely holding the fish parallel with the hooks and the line or snell leading therefrom. In the use of a live bait fish, the fish may swim naturally and is not injured while held on the hook. Moreover, the hook is effectively concealed. In the case of a dead bait fish, the fish is held so that it may be moved through the water as though alive.

Figure 4:
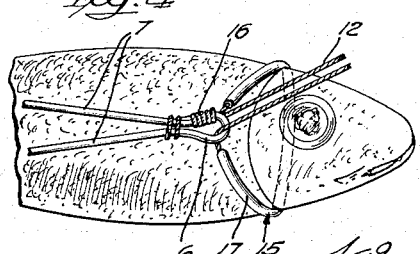
Fig. 4 is a fragmentary elevational view similar to Fig. 2 of a modified form of this invention.

As shown in Fig. 4, the loop 15 may be covered with a rubber tube 17 or similar soft cushioning material so as not to injure a live bait fish. In all other respects this modified form of the hook is the same as shown in Figs. 1, 2, 3 and 5.

It should be noted that the hook unit hereof may be used to advantage with any form of cut bait, or dead or live bait other than fish, such as frogs, grasshoppers and other animals and insects, either with or without use of the loop 15. The offset and crossed bills and the arrangement of the shanks make it possible effectively to hold bait on the hook unit without the loop although for fish, animal and insect bait the use of the loop is preferable.

Figure 5:
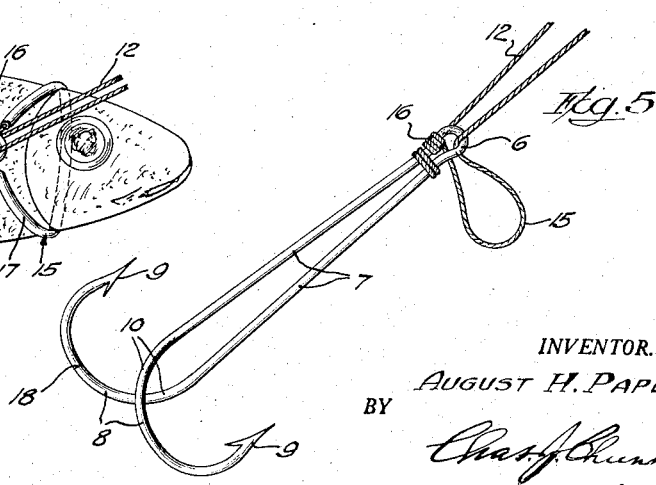
Fig. 5 is a perspective view of the hook unit, removed from the bait fish.

If it is desired to use the hook unit hereof with but one barbed point, one of the bills 8 may be cut off for example at the point designated 18 as shown in Fig. 5.

With reference to the foregoing description and accompanying drawing it will be apparent that the present invention provides a novel fish hook unit wherein shank means, an eye and one or more barbed pointed ends of the unit are provided with means adjacent the eye and adjacent the one or more barbed ends for embracing bait at axially spaced points on the bait with the latter extending alongside the shank means and held on the unit in a manner most favorable to having the fish take the bait and become securely hooked.

I claim:

1. A bait holding fish hook including; a pair of opposed shanks having an eye at one end; and portions joined to the other ends of said shanks and laterally offset from said shanks in the same direction and terminating in barbed points, said portions crossing one another between the juncture thereof with said shanks and said points.

2. A bait holding fish hook comprising: an eye; a pair of resilient shanks extending divergently from said eye in opposed relation to one another; and bill portions joined to said shanks and terminating in barbed portions; said bill portions being laterally offset from one side of said shanks and crossing one another between said points and the juncture of the bill portion with said shanks.

3. A bait holding fish hook comprising; an eye; a pair of resilient shanks extending divergently from said eye in opposed relation to one another; and bill portions joined to said shanks and terminating in barbed portions; said bill portions being laterally offset from one side of said shanks and crossing one another between said points and the juncture of the bill portions with said shanks; and means joined to said eye forming a loop for embracing bait; said bill portions, being operable for embracing said bait while said bait is held by said loop.

4. A fish hook comprising: an eye; a pair of opposed shanks extending from said eye; bills joined to said shanks and terminating in pointed barbed ends; portions of said shanks and bills adjacent to juncture of the shanks and bills being laterally offset from one side of said shank, said bills crossing one another between the shanks and the pointed barbed ends, whereby the bills may be spread to embrace a portion of bait; and means joined to the hook adjacent the said eye for embracing another portion of said bait so that said shanks lie well along one side of the bait.

References Cited in the file of this patent
UNITED STATES PATENTS

| | | |
|---|---|---|
| 1,312,734 | Jones | Aug. 12, 1919 |
| 2,143,054 | Copeland | Jan. 10, 1939 |
| 2,233,338 | Brewer | Feb. 25, 1941 |
| 2,732,652 | Parks | Jan. 31, 1956 |
| 2,775,058 | Roberts | Dec. 25, 1956 |